United States Patent [19]

Olmstead et al.

[11] 4,041,241

[45] Aug. 9, 1977

[54] SEALING GROMMET

[75] Inventors: Clarence W. Olmstead, Lawton; Fred E. Triquet, Paw Paw, both of Mich.

[73] Assignee: Arco Industries Corporation, Schoolcraft, Mich.

[21] Appl. No.: 710,825

[22] Filed: Aug. 2, 1976

[51] Int. Cl.² .................. H01B 17/30; F16L 5/02
[52] U.S. Cl. .................. 174/153 G; 248/56; 277/178; 277/189
[58] Field of Search ............ 174/65 G, 152 G, 153 G; 339/94 A, 126 RS, 128; 248/56; 285/162; 277/166, 178, 179, 189

[56] References Cited

U.S. PATENT DOCUMENTS

| 2,647,002 | 7/1953 | Brummer | 277/178 |
|---|---|---|---|
| 2,826,441 | 3/1958 | Niessen | 277/178 |
| 2,897,533 | 8/1959 | Bull et al. | 174/153 G X |
| 3,182,119 | 5/1965 | Millard | 174/153 G X |
| 3,182,120 | 5/1965 | Duhn | 174/153 G X |
| 3,654,382 | 4/1972 | Rubright | 174/153 G |

Primary Examiner—Laramie E. Askin
Attorney, Agent, or Firm—Reising, Ethington, Barnard, Perry & Brooks

[57] ABSTRACT

A grommet of the type adapted to lockingly mount within and seal an opening in a panel and wherein said grommet includes an elastomeric body having a nonelastomeric locking ring imbedded substantially entirely within said body such that the body includes first and second elastomeric annular sealing surfaces adapted to respectively seal against the face of the panel surrounding the panel opening and also to seal within the panel opening.

8 Claims, 12 Drawing Figures

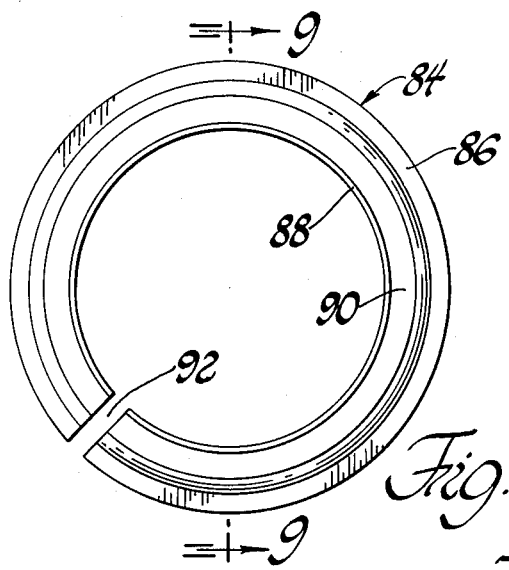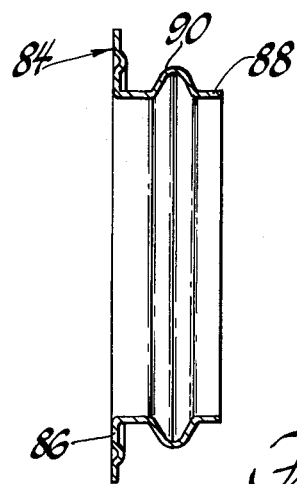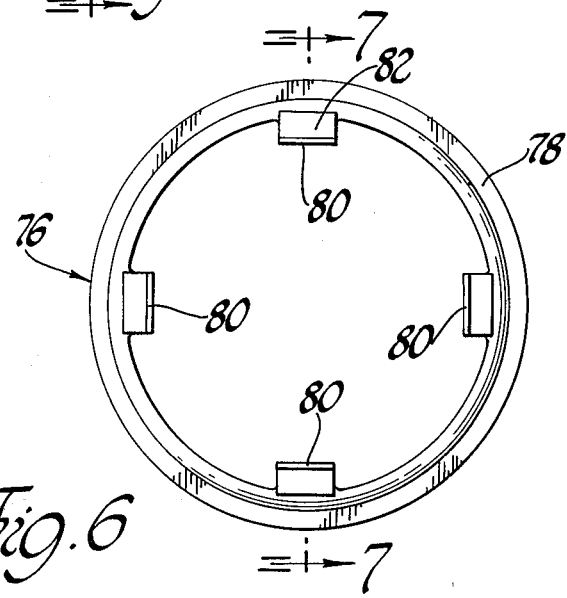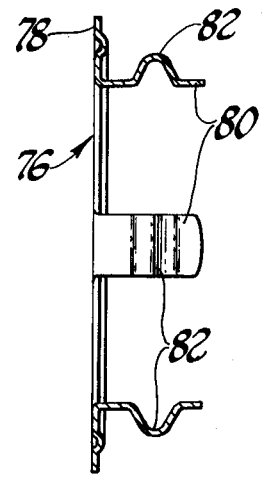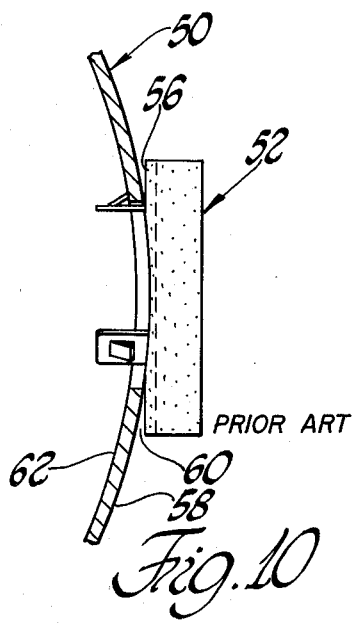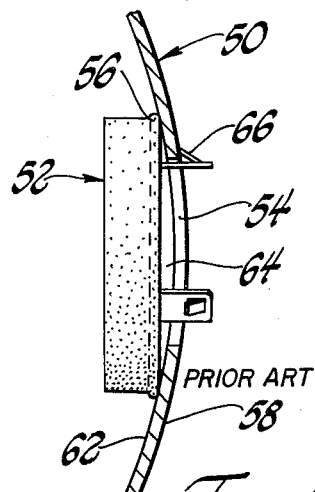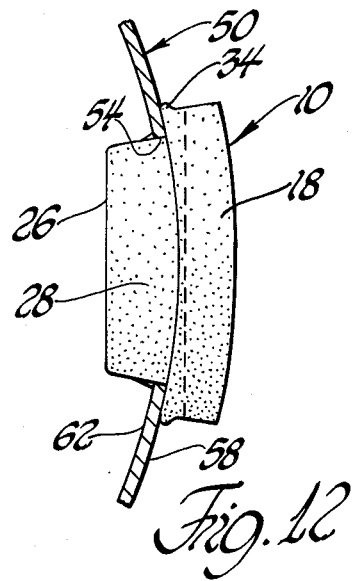

SEALING GROMMET

BACKGROUND OF THE INVENTION

Grommets of the type with which the present invention is concerned are adapted to be mounted and retained within a panel or wall opening. As so mounted, such grommets are also intended to support means such as wires, conduits, or cables which extend through the wall or panel but are maintained out of contact therewith by the grommet. Grommets of this general type are shown in U.S. Pat. Nos. Re. 26,740; 3,182,119; 3,182,120; and 3,654,382. As shown in the aforementioned patents, it is also necessary with this type of grommet to provide suitable means to snap in or otherwise retain the grommet within the panel opening. Accordingly, it has been common practice to form such grommets of an elastomeric material within which a non-elastomeric retaining member or ring is at least partially imbedded so as to present locking fingers or tangs which coact with the panel opening to lock the grommet therewithin.

In certain environments such as in automobiles where grommets are commonly used in the wall or panel between the passenger and engine compartments, it is not only necessary but presently mandated by law that such grommets seal the panel openings so as to prevent the flow of liquids or gases therethrough. Thus, the grommet of the type shown in aforementioned U.S. Pat. No. 3,654,382 is particularly designed and directed to include a sealing function.

The present invention is an improvement over such earlier types of sealing grommets and particularly includes a unique monolithic elastomeric body design wherein a panel opening is more effectively sealed against the flow of gases or liquids therethrough and, further, in which the non-elastomeric locking element is essentially entirely imbedded in the body in such a way as to avoid undesired exposure of the locking element and preventing any contact therewith by the wire, cable, conduit, or the like, supported by the grommet or any other member otherwise proximate to the panel opening.

Another problem with heretofore known types of grommets has been their general inability to properly seal an opening where it is formed in a curved or arcuate panel surface. For example, while a grommet such as that shown in U.S. Pat. No. 3,654,382 effectively seals an opening in a flat panel section, it provides a less effective seal where the panel is of a curved cross-section. The problem in sealing against an arcuate surface with heretofore known types of grommets basically relates to the use of a single planar elastomeric sealing surface. In such case an annular lip or edge is compressed against the panel surface to be sealed and retained in such position by the grommet locking means. As the panel surface becomes curved or arcuate in cross-section, the panel surface, in effect, either moves away from the sealing edge of the grommet when the grommet is mounted on the convex side of the curve, or moves toward the sealing edge when the grommet is mounted on the concave side of the curve. In either event and since the curved panel is normally the section of a cylinder, a gap results at some point between the grommet sealing edge and the panel surface which thereby prevents effective sealing. If one attempts to obviate the gapping problem by increasing or decreasing the size or thickness of the sealing lip or edge, then it becomes difficult, if not impossible, to compress the lip sufficiently to permit adequate locking engagement between the locking tangs and the panel opening.

The sealing grommet of the present invention is uniquely adapted to seal an opening in either a flat or a curved panel by not only providing a first planar elastomeric surface which coacts with the panel surface surrounding the panel opening but by also providing a second annular elastomeric sealing surface which coacts with the panel opening itself to insure a proper seal by the grommet.

SUMMARY OF THE INVENTION

It is a basic feature of the present invention to provide a grommet which has a plurality of elastomeric sealing surfaces capable of sealing against different and angularly related surfaces of a panel and panel opening. More specifically, the grommet of the subject invention includes a monolithic elastomeric body having angularly offset sealing surfaces adapted to respectively coact with the outer surface of the panel as well as the interior surface of the panel opening to insure effective sealing of the panel opening against the flow of liquids or gases therethrough.

Several modifications of the invention are shown in the drawings and described in the specification. All modifications of the invention utilize a monolithic elastomeric body having a suitable locking ring or member imbedded therewithin. More specifically, the elastomeric body includes a projecting annular portion within which suitable panel-engaging locking fingers or projections are imbedded such that the locking ring is entirely encapsulated or imbedded within the elastomeric body. Further, those portions of the locking ring adapted to engage with and lock the grommet within the panel opening are exposed after and only to the extent necessary to lock the grommet within the panel opening and, even then, only in such a way as not to expose the remainder of the locking ring or locking ring projections.

More specifically, the monolithic elastomeric body of the present invention includes a circular base portion having an outer annular lip adapted to seal against a panel surface adjacent an opening therein and a radially inset annular portion projecting longitudinally from the base portion and which annular portion is adapted to project through the panel opening so as to resiliently seal against the interior of the panel opening whereby the grommet will seal the opening in either a flat or arcuate panel member. It is thus unique to the present invention to provide elastomeric and resilient sealing surfaces which seal the grommet both against the panel surface and also within the panel opening.

The details of the subject invention will be better understood by reference to the drawings and the specification which follows.

In the drawings:

FIG. 6 is a plan view of a modified form of locking ring;

FIG. 7 is a sectional view along lines 7—7 of FIG. 6;

FIG. 8 is a plan view of a modified form of locking ring;

FIG. 9 is a sectional view along lines 9—9 of FIG. 8;

FIGS. 10 and 11 are partially sectioned views through a curved panel section in which is mounted a prior art-type grommet; and FIG. 12 is a partially sectioned elevational view of a curved panel having a grommet of the type shown and described in the invention mounted therein.

Figure 1:
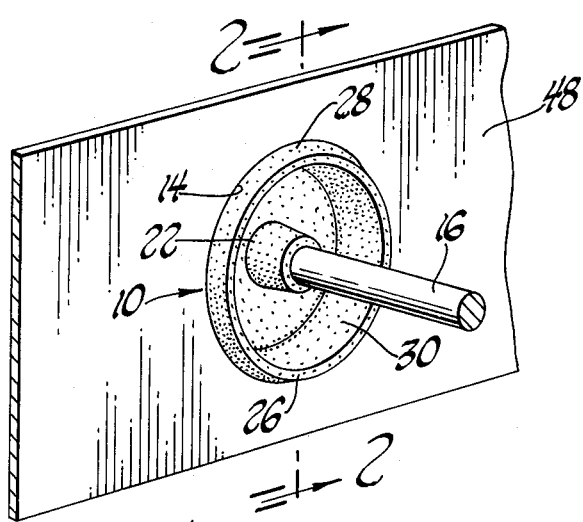
FIG. 1 is a perspective view showing the grommet of the invention inserted in a panel.
Figure 2:
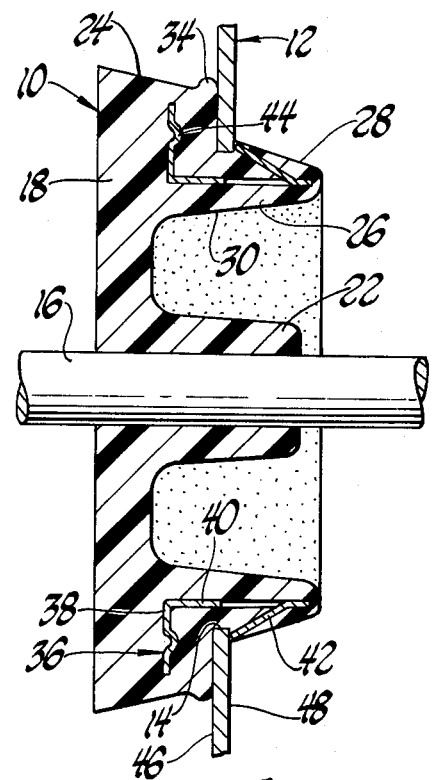
FIG. 2 is a sectional view along lines 2—2 of FIG. 1.

Referring particularly to FIGS. 1 and 2 of the drawings, a grommet is indicated generally at 10 and is adapted to be mounted on a panel 12 so as to seal an opening 14 formed within the panel. As seen in FIGS. 1 and 2, a suitable member 16, which may be a wire, cable, conduit, or the like, is supported within the grommet so as to be mounted in spaced relationship to the panel opening 14.

As the term is used herein, "elastomeric" means a rubber-like material, natural or synthetic, which is readily compressible and deformable such that it will take the shape of or conform to a coacting surface while tending to return to its original and unrestrained shape. An example of such a material used with grommets made in accordance with the present invention is a low durometer vinyl which can contain an additive to make the grommet self-extinguishing in the event it is used in an environment where an exposure to a flame is possible. On the other hand, "non-elastomeric" refers to a material such as steel which is not readily deformable and compressible in the sense of assuming or conforming to the shape of a coacting member.

A preferred form of the invention is shown in FIGS. 1 through 4 wherein grommet 10 consists of an elastomeric body having a circular base portion 18 through which an opening 20 is formed and adapted to sealingly engage member 16. In this form of the invention, an annular sleeve 22 extends longitudinally from circular base portion 18 and is coaxially and concentrically related to body opening 20. The purpose of annular sleeve 22 is to snugly engage and sealingly support member 16. The length or even presence of sleeve 22 is determined by the type of member being supported within base opening 20 and the difficulty in sealing the same against leakage through the grommet opening.

The periphery of circular base portion 18 includes an outer wall surface 24 which perferably tapers radially inwardly toward a central longitudinal axis of the elastomeric body. The elastomeric body also includes an annular portion 26 radially inset from the outer peripheral surface 24 and projecting longitudinally from base portion 18. Annular body portion 26 includes generally converging outer and inner wall surfaces 28 and 30. The outer wall surface 28 of annular portion 26 intersects the circular base portion along a circular line which is radially inset from the outer peripheral surface 24 of said base portion so as to define a recess 32 therebetween and which recess and peripheral surface terminate in an annular lip 34.

Figure 4:
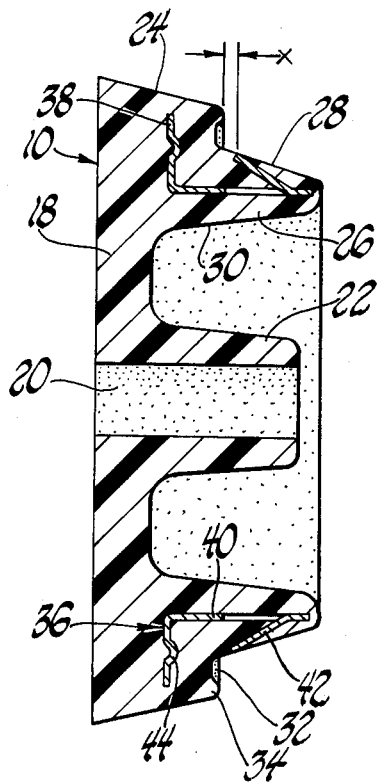
FIG. 4 is a sectional view along lines 4—4 of FIG. 3.
Figure 5:
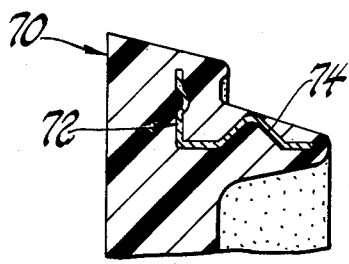
FIG. 5 is a fragmentary sectional view showing a modified type of locking ring.

A locking ring member 36 is shown in FIGS. 2 and 4 and includes a radially extending washer-like base portion 38 from which a plurality of fingers 40 project longitudinally. A locking tang 42 is formed or struck from the outer end of each finger 40 and includes a free end which extends outwardly and rearwardly toward ring portion 38. Locking ring base portion 38 includes an annular stiffening ring 44.

Figure 3:
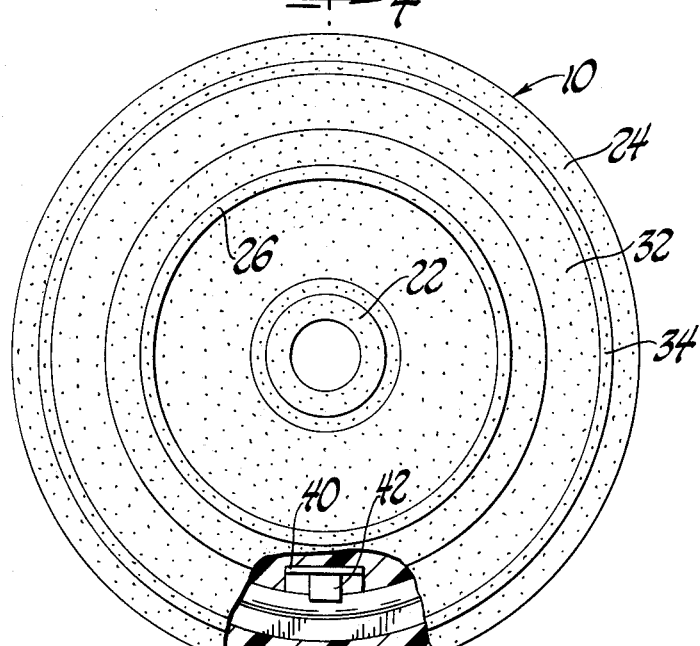
FIG. 3 is a front view of the grommet.

As best seen in FIGS. 2 and 3, locking ring 36 is completely imbedded within the monolithic elastomeric body member 18–26. More specifically, base ring 38 of the locking ring is imbedded within circular base portion 18 of the elastomeric body while the fingers 40 extend from the base ring and are embedded between the converging outer and inner walls 28 and 30 of the annular body portion 26.

The outwardly extending locking ring projections or tangs 42 terminate at the free end thereof at the outer wall surface 28 of the annular body portion 26. As best observed in FIG. 4, it is also to be noted that the radially outermost portion of the locking tang or projection terminates proximate to and in radially spaced relation with annular sealing lip 34. The longitudinal distance, designated as X in FIG. 4, is determined by the thickness or gauge of panel 12 and, in any event, is less than such panel thickness.

Referring again to FIG. 2, the diameter of panel opening 14 is less than the radial extent of the free end of locking ring tangs 42. Thus, when grommet 10 is to be mounted upon panel 12, annular portion 26 of the monolithic elastomeric body is inserted into panel opening 14. As body lip 34 approaches panel surface 46, locking tang 42 and finger 40 are flexed radially inwardly. At the same time, annular body portion 26 is radially compressed and also fixed inwardly. Before the free ends of locking ring tangs 42 clear the opposite surface 48 of panel 12, annular lip 34 engages and is compressed by panel surface 46. Further insertion movement of grommet 10 enables the free ends of tangs 42 to clear panel surface 48 whereby the compressed elastomeric material of annular body portion 26, the flexed fingers 40, and locking tangs 42 are radially relieved sufficiently to permit the tangs to return to their undeflected position thereby locking the tangs behind panel surface 48.

With tangs 42 locked behind panel surface 48, annular body lip 34 is retained in a compressed condition and thereby provides a first seal with panel surface 46. In this condition, that part of the annular body portion 26 between the free end of the locking tangs 42 and body recess 32 remains radially compressed and is thereby resiliently urged into sealing engagement with the periphery of panel opening 14. Thus panel opening 14 is doubly sealed, first by lip 34 and second by the outer surface 28 of annular body portion 26. The panel opening sealing function by the resilient and compressible annular portion 26 is particularly significant when grommet 10 is mounted on a curved surface as will be further described in relation to FIGS. 10 through 12.

As previously noted, with earlier types of sealing grommets, such as that shown in U.S. Pat. No. 3,654,382, sealing of the panel opening has been achieved by a single grommet sealing surface analogous to annular lip 34. So long as such previous type grommet sealing surface coacts with a flat panel surface, a reasonably effective seal of the panel opening is achieved. However, where a curved panel 50 of the type shown in FIGS. 10 through 12 is involved, maintaining a proper seal of the panel opening is far more difficult.

To illustrate the problem of sealing against a curved surface, specific reference now is made to FIGS. 10 and 12. It is to be understood that the typical curved panel 50 is a section of a cylinder rather than a section of a sphere. Thus, if the prior art type of grommet 52 is inserted in a panel opening 54 as shown in FIG. 10, the elastomeric sealing lip or surface 56 is proximate the convex wall 58 of the panel. In this condition, radially inner portions of the grommet sealing surface 56 will contact the convex panel surface 58. However, as the panel surface curves away from the grommet, a gap 60 results between adjacent panel and grommet surfaces so as to permit leakage therethrough.

Likewise, if the prior art type grommet 52 is mounted against the concave surface 62 of panel 50, as shown in FIG. 11, a radially inner gap 64 results again permitting leakage around the grommet.

If the problem of non-sealing against a curved panel surface is attempted to be solved by changing the depth or thickness of the grommet sealing surface or lip 56, then a different problem is created. For instance and returning to the disclosure of FIG. 10, if the grommet sealing lip is made longitudinally deeper in an effort to bridge the gap 60, then it becomes difficult, if not impossible, to sufficiently compress the deepened grommet lip thereby impairing the ability of locking tangs 66 to reach and lock behind the opposite or concave wall surface 62 of panel 50.

Reference is now made to FIG. 12 wherein grommet 10 of the present invention is mounted upon curved panel 50. In this case it will be seen that annular portion 26 of the elastomeric grommet body projects through panel opening 54 and since such portion has been resiliently compressed in passing through the opening, outer surface 28 resiliently seals against the inner periphery of the panel opening. Thus, even if the entire circumference of annular lip 34 does not reach and seal against the convex wall surface 58 of the panel, annular portion 26 will provide an effective seal for the panel opening.

It is an important advantage to provide a monolithic elastomeric body whereby annular portion 26 in being resiliently compressible will conform to the inner surface of the panel opening and thereby insure an effective seal. On the other hand, if annular portion 26 is absent or is formed of a non-elastomeric, i.e. non-resilient material, it could not adapt to undesired variations, such as out-of-roundness, between the annular portion and the panel opening.

Again referring to prior art type sealing grommets, such as shown in U.S. Pat. No. 3,654,382, the locking ring is typically formed from a spring steel material such as C-1050. Such a material is necessary to achieve the requisite spring or flexibility in the fingers and locking tangs. While such a spring steel material may be used for the locking ring of the present invention, it has been found that a less hard and therefore lower cost steel, such as a quarter hard C-1010, may be used. The reason such a less hard steel may be used is due to the fact that the locking ring fingers 40 and tangs 42 are imbedded in annular body portion 26 the resilience of which supplements the springiness or flexibility of the fingers and tangs and thereby facilitates the return of the fingers and tangs to their undeflected position after they have passed through panel opening 14 or 54.

Further modified forms of locking rings are shown in FIGS. 5 through 9. In the fragmentary view of FIG. 5, grommet 70 includes a locking ring 72 having an offset locking portion 74 in lieu of locking tangs 42. Referring first to the ring form of FIGS. 6 and 7, locking ring 76 again includes a circular base ring 78 from which fingers 80 longitudinally project. Fingers are radially offset to provide locking projections 82. In this case, when the grommet is inserted through a suitable panel opening, fingers 80 flex radially inwardly until offset projection 82 clears the panel opening and thereafter locks behind the panel.

In the modification of FIGS. 8 and 9, locking ring 84 includes a radial flange 86 and a longitudinally extending cylindrical portion 88 having an intermediate offset locking portion 90 formed thereon. In order to provide circumferential flexibility, a longitudinal gap 92 is formed through the flange and cylindrical portion. In such case, the circumference of locking ring 84 is reduced until the offset portion 90 has passed through a suitable panel opening.

An advantage of the offset locking portions 82 and 90 of FIGS. 6 and 8 is that they are more easily formed than is the locking tang 42 of FIG. 2.

It is apparent that other modifications of the subject sealing grommet may be made within the scope of the invention set forth in the hereinafter appended claims.

What is claimed is:

1. A snap in grommet of the type for mounting in a panel opening wherein an elastomeric body is formed with an opening adapted to sealingly support a member therein, said body opening including a longitudinal axis, and a nonelastomeric element having a base portion imbedded in said elastomeric body, said element including locking means extending longitudinally from said base portion, said locking means having radially outwardly offset portions, wherein the improvement comprises: said elastomeric body having an annular portion spaced radially outwardly of the body opening, said annular body portion including inner and outer wall surfaces, the locking means of said non-elastomeric element being imbedded in said body such that the radially outwardly offset portions terminate at the outer wall surface of said annular portion, said elastomeric body including a longitudinally extending lip concentrically spaced outwardly of said annular portion and disposed proximate the radially offset portions of said locking means whereby said lip, the radially offset portions of said locking means and the annular body portion coact to sealingly lock the grommet within a panel opening.

2. A snap in grommet of the type adapted to lockingly mount within and seal an opening in a panel, said grommet comprising an elastomeric body having a longitudinally extending annular portion, said annular portion including converging inner and outer wall surfaces, a nonelastomeric locking ring imbedded within said body and including radially outwardly offset portions disposed between the inner and outer wall surfaces of said annular body portion, the outer wall surface of said annular portion being radially offset to provide a lip proximate to and radially outwardly of the offset portions of said locking ring, said lip and said locking ring offset portions being adapted to be disposed on opposite sides of a panel and cooperating therewith to maintain said lip in sealing engagement about the panel opening.

3. A snap in grommet of the type adapted to lockingly mount within and seal a panel opening, said grommet comprising a monolithic elastomeric body having a circular base portion and an annular portion projecting longitudinally from the base portion and being concentric therewith, said annular portion including converging inner and outer wall surfaces, a nonelastomeric locking ring imbedded within said body and including radially outwardly offset locking portions imbedded between the inner and outer wall surfaces of said annular body portion, the outer wall surface of said annular portion intersecting said base portion radially inwardly of the outer periphery of said base portion, an annular sealing lip formed on said base portion proximate to and radially outwardly of the line of intersection of said annular body portion with said circular base portion, said annular sealing lip extending longitudinally toward and terminating in proximately spaced relation to the locking portions of said locking ring, said annular sealing lip and the locking portions of said locking ring being adapted to be disposed on opposite sides of a panel and cooperating therewith to sealingly mount the grommet within a panel opening.

4. A grommet of the type set forth in claim 3 wherein said locking ring comprises a radially extending washer-like base element imbedded in the base portion of said elastomeric body and a plurality of fingers projecting normally from the washer-like base element, said radially offset locking portions being formed in said fingers.

5. A grommet of the type set forth in claim 4 wherein said fingers are imbedded in and radially supported by the annular portion of the elastomeric body.

6. A grommet of the type set forth in claim 4 in which the offset portion of each locking ring finger comprises a tang formed at the outer end of each finger, each tang being inclined outwardly and rearwardly toward the washer-like base element, the free end of each tang terminating at the outer wall surface of the annular body portion and proximately spaced to the annular sealing lip.

7. A grommet of the type set forth in claim 3 wherein said locking ring comprises a radially extending washer-like base element imbedded in the circular base portion of the elastomeric body, a hollow cylindrical element projecting normally from the washer-like base element, said radially offset locking portions being formed in said cylindrical element, and a longitudinal gap formed through said base and cylindrical elements whereby the locking ring may be flexed to vary the circumference thereof to allow said locking portions to pass through and lock behind said panel opening.

8. A snap in grommet of the type adapted to lockingly mount within and seal a panel opening, said grommet comprising a monolithic elastomeric body having a longitudinally extending annular portion, said annular portion including inner and outer wall surfaces, a nonelastomeric locking ring imbedded within said body and including radially outwardly offset portions disposed between the inner and outer wall surfaces of said annular body portion, the outer wall surface of said annular portion being radially offset to provide a continuous lip proximate to and radially outwardly of the offset portions of said locking ring, said lip and said locking ring offset portions being adapted to be disposed on opposite sides of a panel and cooperating therewith to sealingly lock the grommet within a panel opening, said annular body portion providing continuous support for and resiliently resisting deflection of the locking ring offset portions.

* * * * *